United States Patent

Gerkema

[15] 3,705,397

[45] Dec. 5, 1972

[54] SELF-ADJUSTING SUPPORTING MEMBER HAVING A MAGNETIC HEAD

[72] Inventor: Jan T. Gerkema, Emmasingel, Netherlands

[73] Assignee: U.S. Philips Corporation, New York, N.Y.

[22] Filed: Oct. 30, 1970

[21] Appl. No.: 85,393

[30] Foreign Application Priority Data

Nov. 7, 1969 Netherlands ........................6916800
Oct. 16, 1970 Netherlands ........................7015194

[52] U.S. Cl. ......................340/174.1 E, 174/100.2 P
[51] Int. Cl. ................................................G11b 5/60
[58] Field of Search ...........340/174.1 E; 179/100.2 P

[56] References Cited

UNITED STATES PATENTS

| | | | |
|---|---|---|---|
| 1,425,979 | 8/1922 | Kingsbury | 340/174.1 E |
| 3,187,313 | 6/1965 | Smith, Jr. | 340/174.1 E |
| 3,593,326 | 7/1971 | Turner | 340/174.1 E |
| 3,603,742 | 9/1971 | Schuller | 340/174.1 E |
| 3,151,319 | 9/1964 | Marrs | 340/174.1 E |
| 3,249,701 | 5/1966 | Silver | 340/174.1 E |
| 3,488,648 | 1/1970 | Church | 340/174.1 E |
| 3,489,381 | 1/1970 | Jones et al. | 340/174.1 E |

*Primary Examiner*—Vincent P. Canney
*Attorney*—Frank R. Trifari

[57] ABSTRACT

In hydrodynamically operating suspension devices which have for their object to keep a magnetic head at a constant distance from a rotating memory disk, the magnetic head was so far incorporated in the lower side of a flexible rubber or plastic box. The head is now incorporated in a diaphragm of a ductile metal. A diaphragm with incorporated head is manufactured by pressing the head on a polished mould, by the electroless and/or electrolytic deposition of metal on the sides of the head and the adjoining part of the mould, and finally by stripping the assembly from the mould.

3 Claims, 2 Drawing Figures

Figure 1:
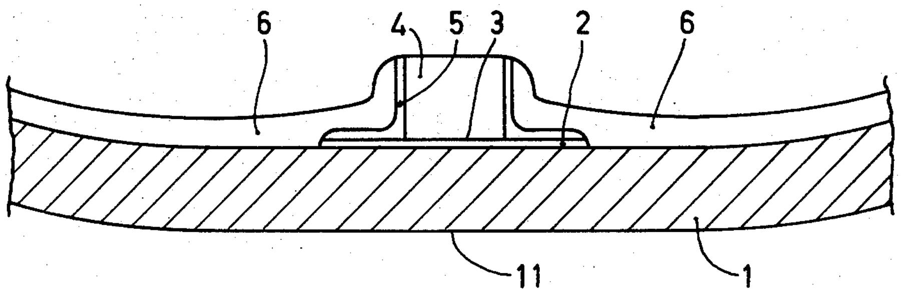

INVENTOR.

JAN T. GERKEMA

BY

AGENT

SELF-ADJUSTING SUPPORTING MEMBER HAVING A MAGNETIC HEAD

The invention relates to a self-adjusting supporting member having at least one magnetic head and serving to keep said head at a constant small distance from a moving recording medium, a part of the said supporting member facing the recording medium being constructed so as to be flexible and enclosing the part of the magnetic head in which the front face with the operating gap is present.

Such a supporting member having a magnetic head is known from the U.S. Pat. No. 3,151,319 in which the part facing the recording medium is formed by the lower side of a flexible box. Said box is manufactured from rubber or plastics, while the magnetic head may be melted or glued in the center of the lower surface thereof.

When such a flexible box is kept at a very small distance from a rapidly moving surface which drags along a layer of air, for example, a memory disk, the flexible lower surface which is comparable to a diaphragm adjusts in such manner as to remain floating at a constant distance from the recording surface, which distance is dependent upon the inner pressure in the box, said constant distance being maintained also when said surface comprises irregularities.

A drawback of such a supporting member which is manufactured from rubber or plastics, however, is that as a result of the specific properties of said materials (plastics for example, may show recrystallization in the long run), the location of the operative gap of the magnetic head is not accurately defined. Actually, as a result of the plastic deformation occurring, the magnetic head may assume a different position relative to the recording medium.

It is the object of the invention to provide a device of the above described type having such a construction that the said drawback is avoided. According to the invention this is achieved in that the part of the supporting member facing the recording medium is a diaphragm consisting of a metal provided by means of a molecular method of providing.

It has been found possible by means of molecular methods of providing to manufacture very thin metal diaphragms (thickness form 1 to 10 microns) which have the properties desirable for the above-mentioned purpose as regards ductility and rigidity.

A further drawback of supporting members of rubber or plastics is that it is difficult to give the lower surface a curvature which is required for good floating properties, without adversely influencing the desirable flexibility. The diaphragm according to the invention can be given such a curvature without said drawback. It has been found that a diaphragm in the form of a dish having a flat bottom and curved edges gives very good satisfaction.

A drawback of the known rubber or plastics supporting members furthermore is that the magnetic head has to be glued or melted in the lower surface. As a result of this it is substantially not possible to obtain a continuous transition between the operative surface of the magnetic head and the lower surface of the supporting member. Between said surfaces a staggering of a few microns will usually occur which adversely influences the recording properties since the distance at which the head must float from the recording medium is also of the order of magnitude of a few microns.

The invention also relates to a self-adjusting supporting member having a magnetic head which is characterized in that the front face of the magnetic head and the flexible part of the supporting member are accurately located in one plane. This embodiment is based on the experimentally obtained recognition of the fact that it is possible to provide a thin metal film around a magnetic head by means of a molecular method of providing, for example, vapor deposition, sputtering and electroless or electrolytic deposition, without the said staggering occurring, For that purpose, the method according to the invention is characterized by the following steps:

a magnetic head, or the part thereof in which the front face is present, is pressed on a very smoothly polished mould of the desirable shape with the front face of the magnetic head facing the mould.

Although the method according to the invention permits of providing a film of metal around a magnetic head without staggering so that a truly plane floating surface is obtained, the invention presents the alternative possibility of providing, on purpose, a staggering which can be accurately determined by means of the mould. This means that a diaphragm can be manufactured from which the head projects over a distance which can be accurately determined, while in addition the requirement can be fulfilled that the front face of the head be parallel to the frame of the diaphragm.

According to a preferred embodiment of the method according to the invention such a construction can be realized by etching away a part of the surface of the mould down to a depth which corresponds to the distance over which the head is to project, and by arranging the head, or the part thereof which comprises the operative gap, in the etched-away part. The diaphragm can then be provided in the above-described manner.

An advantage of the construction thus obtained is that, for example by means of a diaphragm from which a head projects by 4 microns, the diaphragm can be made to float at a distance of 6 microns from the disk, so that the effective floating distance of the operative face of the head is only 2 microns. The difficulties associated with the floating of a diaphragm at distances of 2 microns (and less) from a memory disk are hence avoided.

An advantage of the method described is in particular that, since the mould can be used over and over again, heads which project accurately equally far from a diaphragm can be mass-produced.

A thin layer of metal is provided on at least a part of the sides of the magnetic head and the surface of the mould by means of a molecular method of providing, the metal film with magnetic head is chemically or mechanically (stripping) removed from the mould.

A good adherence of the metal film to the magnetic head is of great importance. For a good adherence the film should readily adjoin the sides of the magnetic head, in other words, the corners formed by the sides of the head and the bottom of the mould should be readily filled.

It has been found that metal deposited from an electroless bath provides a readily adhering layer which extends continuously in corners and readily follows the corners.

A preferred embodiment of the method according to the invention is therefore characterized in that the metal is deposited from an electroless bath on at least a part of the sides of the magnetic head and on at least the adjoining part of the surface of the mould.

A further preferred embodiment of the method according to the invention is characterized in that a first metal is deposited from an electroless bath on at least a part of the sides of the magnetic head and on the adjoining part of the surface of the mould, after which the metal film is completed by electrolytically depositing a second metal until the desirable thickness is obtained.

The advantage of an electrolitically deposited metal layer, for which Cu has been found to be very suitable is that the deposition occurs more rapidly than with the electroless method, while in addition a stronger metal layer can be obtained.

The process of the electroless deposition of the desirable metal is preferably started on an activated layer.

Good results are obtained in particular with the electroless deposition of NiP on a layer of Ni or Pd provided previously in an electrolytic bath.

A preferred embodiment of the method according to the invention is characterized in that NiP is used for the metal to be provided from the electroless bath, that Cu is used for the metal to be provided electrolytically and that a layer of Pd is provided electrolytically as an activated layer.

Figure 2:
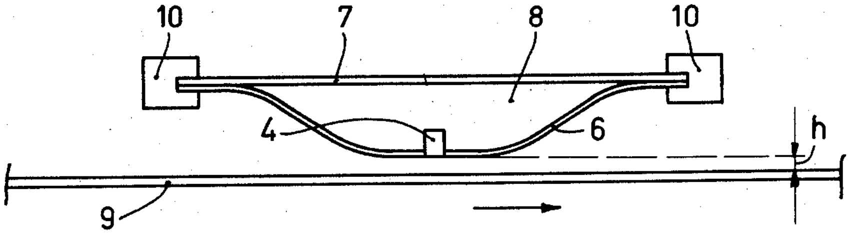

In order that the invention may be readily carried into effect, it will now be described in greater detail, by way of example, with reference to the accompanying drawing, in which FIG. 1 shows an embodiment of the method according to the invention, FIG. 2 is a cross-sectional view of a suspension device according to the invention.

FIG. 1 shows how a metal diaphragm is manufactured by means of the method according to the invention and which forms one rigid assembly with a magnetic head, while the transition from the active surface of the magnetic head to the diaphragm shows no staggering.

Reference numeral 1 denotes a mould which has a very smoothly polished inner surface and which has a curvature desirable for the diaphragm to be manufactured. Dependent upon the way in which the metal for the diaphragm is provided, the material of the mould may be metallic (for example, stainless steel) or nonmetallic (for example, glass). Since the diaphragm has to be removed from the mould after its manufacture, it is recommendable to take measures beforehand to facilitate said removal. When the mould consists of glass, it should previously be slightly roughened, for example, in such manner that during the deposition the metal readily adheres and forms no blisters, while nevertheless it can easily be stripped from the substrate after it has been deposited. Another manner is first to provide a separation layer 2 on the mould or to use a mould which by nature already has a separation layer (for example, an oxide layer). It is to be noted that in particular a deposited layer of copper can easily be removed from a stainless steel mould.

A magnetic head 4, or if desirable only the operative gap including part thereof, is then laid on the mould with the operative surface 3 and kept pressed against it. In the case in which the magnetic head consists of ferrite, first an electrically readily conducting layer is provided on the ferrite, for example, of Au. It is recommendable to provide said layer on a layer of a metal which readily adheres to ferrite, for example Cr.

After these preparatory measures, the metal layer 6 is provided. A metal which as regards mechanical properties is suitable for this purpose is Cu. The mould 1 with the head 4 rigidly pressed thereon is for that purpose immersed in a copper bath. This may be both an electroless bath, that is to say a bath from which a metal layer is deposited homogeneously and with a uniform thickness on an activated layer, by electroless plating and an electrolytic bath. From electrodedeposition technology are known, for example, a series of electrolytic Cu-baths, in which there may be distinguished between baths having a good microspreading (i.e. the smallest irregularities are filled), baths having a good microspreading (i.e. a layer having a homogeneous thickness is obtained without particular requirements being imposed upon the arrangement of the electrodes), or baths which combine both properties to a greater or smaller extent. In the embodiment described here, an electrolytic Cu bath is used which ensures particularly a good micro-spreading. Composition: copper sulphate 200 g, concentrated sulphuric acid 55 g; hydrochloric acid 25 mg; glaze 3 ml.

It is recommendable to secure one of the electrodes exactly opposite to the head on the outside 11 of the mould.

In the proximity of the head the metal is then deposited as uniformly as possible. It is possible to place the other electrode or electrodes in such manner that a flexible film is obtained around the head in a thickness of 5 to 6 microns and to cause the thickness of the layer to increase beyond the said region so that a non-deformable and readily handable edge is obtained.

Since it has been found that an electroless-deposited metal in corners gives a continuously extending and hence readily adhering connection, a layer of electroless metal 5 is provided on the sides of the head and on the adjoining part of the bottom of the mould prior to the electrolytic deposition of the layer 6. In the example described, said metal 5 is a layer of NiP, thickness a few microns. In order to start the decomposition hereof, first a layer of Pd (2) of from 300 to 500 A is electrolytically deposited on the mould.

After the layer 6 has finally been provided the diaphragm thus obtained is removed from the base. The separation layer 2 may partly remain on the mould but the thickness hereof is so small, in the example described less than 0.05 micron, that the staggering between the active surface of the head and the diaphragm is negligible. In order to avoid that the extremely thin diaphragm creases during the removal from the base, it is possible, for example, to provide on the base previously a thicker layer (for example, from 10 to 20 microns) of another metal. This layer is afterwards removed together with the diaphragm, after which the diaphragm alone is obtained by chemically dissolving the supporting layer.

FIG. 2 shows how a diaphragm 6 with incorporated head 4 manufactured according to the method described is secured (for example, by clamping or soldering) in a holder 10 and together with an upper part 7 forms a closed space 8. This device is positioned at a very small distance from a recording medium 9 (which may be, for example a memory disk) which, during operation, moves in the direction of the arrow at a high speed relative to the suspension device. The diagram then adjusts so that it remains floating at a constant speed $h$ from the disk 9. This distance $h$ may be a few microns. So the diaphragm will adapt to irregularities of the surface of the recording medium so that the danger of damage to the magnetic head is very small. It is to be noted that the distance $h$ can be controlled by giving the space 8 a different pre-pressure.

As already noted above, another aspect of the invention is the possibility of causing a head to project over an accurately determined distance from the diaphragm so that problems associated with the floating of a diaphragm at a very small distance from a memory disk can be avoided.

Another important aspect is that a number of magnetic heads, whether or not cohering together, or only the operative gap including parts thereof can be incorporated in a simple manner in one diaphragm while maintaining the uniformity of the floating surface.

What is claimed is:

1. A self-adjusting supporting member including at least one magnetic head having an operative surface and serving to maintain the magnetic head a constant distance from a relatively moving recording medium, said support member comprising an extremely thin walled flexible metallic diaphragm of approximately 1 to 10 microns in thickness facing said recording medium, said diaphragm molecularly bonded directly to said head with the operative surface thereof exposed through said support member to said recording medium.

2. A self-adjusting supporting member as claimed in claim 1, wherein said operative surface of the magnetic head and the flexible part of the supporting member are accurately located in one plane.

3. A self-adjusting supporting member as claimed in claim 1, wherein said operative surface of the magnetic head projects over an accurately determined distance from the flexible part of the supporting member.

* * * * *